United States Patent [19]
Nakamura et al.

[11] Patent Number: 5,614,146
[45] Date of Patent: Mar. 25, 1997

[54] METHOD AND APPARATUS OF SUPPLYING LABELS TO INJECTION MOLD

[75] Inventors: Akio Nakamura, Kodaira; Noboru Tsukuda, Chiba; Shinichiro Matsushima, Kyoto, all of Japan

[73] Assignees: Sumitomo Heavy Industries, Ltd., Tokyo; Yushin Precision Equipment Co., Ltd., Kyoto, both of Japan

[21] Appl. No.: 558,620

[22] Filed: Nov. 14, 1995

Related U.S. Application Data

[63] Continuation of Ser. No. 150,144, Mar. 25, 1994, abandoned.

[30] Foreign Application Priority Data

Apr. 6, 1992 [JP] Japan ................................. 4-114104

[51] Int. Cl.⁶ ................................................. B29C 45/14
[52] U.S. Cl. ...................... 264/511; 264/509; 425/126.1; 425/129.1; 425/50.3
[58] Field of Search ...................... 264/509, 511; 425/504, 126.1, 129.1, 182, 521, 503; 271/14, 164

[56] References Cited

U.S. PATENT DOCUMENTS

| | | | |
|---|---|---|---|
| 3,556,514 | 1/1971 | Stockman | 425/504 |
| 3,559,248 | 2/1971 | Stockman | 264/509 |
| 3,602,496 | 8/1971 | Langenchl et al. | 271/14 |
| 3,869,234 | 3/1975 | Sutch | 425/126.1 |
| 3,899,277 | 8/1975 | Winter | 425/126.1 |
| 3,999,915 | 12/1976 | Stepenske | 425/126.1 |
| 4,784,593 | 11/1988 | Dromigny | 425/126.1 |
| 4,808,366 | 2/1989 | Kaminski et al. | 264/509 |
| 5,053,101 | 10/1991 | Dromigny | 425/126.1 |
| 5,208,027 | 5/1993 | Weder et al. | 425/126.1 |

FOREIGN PATENT DOCUMENTS

| | | |
|---|---|---|
| 0373023 | 6/1990 | European Pat. Off. . |
| 2009611 | 2/1970 | France . |
| 2606701 | 5/1988 | France . |
| 2122611 | 11/1972 | Germany . |
| 55-118836 | 9/1980 | Japan . |
| 59-31130 | 2/1984 | Japan . |
| 60-41231 | 3/1985 | Japan . |
| 63-149122 | 6/1988 | Japan ..................... 264/511 |
| 2-55119 | 2/1990 | Japan . |
| 4-140119 | 5/1992 | Japan . |
| 461787 | of 0000 | Switzerland . |
| WO93/11924 | 6/1993 | WIPO . |
| WO93/11923 | 6/1993 | WIPO . |

*Primary Examiner*—Catherine Timm
*Attorney, Agent, or Firm*—Nikaido, Marmelstein, Murray & Oram LLP

[57] ABSTRACT

A label L is supplied to an inner surface of a fixed die 6 of an injection molding machine 5. The label is taken from a known label supply device 1 by air suction onto the outer periphery of a pseudo core 2. The pseudo core 2 is pivotally moved from the supply The label is then inserted into the opened fixed die 6 and is stopped at a label delivering position. At this position the label is supplied onto an inner peripheral surface (label retaining part 6a) of the fixed die 6 by air supplied from the air supply device 4B.

2 Claims, 6 Drawing Sheets

METHOD AND APPARATUS OF SUPPLYING LABELS TO INJECTION MOLD

This application is a continuation of application Ser. No. 08/150,144 filed Mar. 25, 1994 abandoned.

TECHNICAL FIELD

The present invention relates to a method of supplying labels to an injection mold, for automatically supplying a label to be inserted onto an inner periphery of a die of an injection molding machine, and to a label supplying apparatus using this method.

Conventionally, a label on the surface of a resin molded product is attached by a manual operation after forming the resin molded product, or by an automatic attaching operation using a label attaching machine. However, the former method of attaching a label based on a manual operation has disadvantages in operational efficiency and attaching accuracy as variations occur.

Meanwhile, the latter attaching method of using a machine has advantages in that the operational efficiency improves in comparison with the former method, and that the attaching accuracy improves because of no variation. However, since substantial equipment cost is increased, the latter method has an economical disadvantage. Moreover, in these methods, since the label is attached after forming the resin molded products, these methods have a disadvantage in that the attaching operation itself is complicated.

A manufacturing method for obtaining resin molded products with labels has already been adopted in the blow molding field. The method omits the complicated attaching operation which is effected after the formation of the resin molded products. In the manufacturing method, as shown in FIG. 10, a label holding recess 51A is formed in advance on an inner surface of one die 51 of a pair of dies 50 and 51 for blow molding. When both the dies 50 and 51 are opened, a label L is fitted in the label holding recess 51A by a manual operation of an operator. A tube-shaped molding material 53 is extruded from a die 52 of an extruding machine, for instance, into a space between both the dies 50 and 51. Then, as shown in FIG. 11, both the dies 50 and 51 are closed and the bottom thereof is fused, and, at the same time, air is sent from an air inlet port 54 into the tube-shaped molding material 53, so that the molding material 53 is expanded and brought into close contact with the inner surfaces of both the dies 50 and 51. At this time, the label L is fused onto the surface of the molding material 53.

After a molded product 54 with the label L fused onto a part of its surface is cooled and solidified, the air is discharged, both the dies 50 and 51 are opened, and the molded product 54 is removed. As a result, a resin molded product 54 with the label L insert-molded is obtained.

Accordingly, it is naturally conceivable to adopt the above-described manufacturing process in injection molding field as well. However, a very high risk is involved in the operation in which the label is fitted onto the inner surface of the die by a manual operation of the operator during the injection mold opened. Therefore, it is virtually impossible to apply the conventional manufacturing process to the injection molding field. Moreover, this manufacturing process has a disadvantage in that it is impossible to provide a label on the entire periphery of the molded product, thereby a maximum area for label setting is restricted to less than half the area of the periphery of the molded product.

DISCLOSURE OF THE INVENTION

The problems to be solved by the present invention are that the conventional manufacturing process is impossible to implement in the injection molding field and that the maximum area for level setting is restricted to half the periphery of the molded product.

To overcome these problems, the present invention is characterized by providing a method of supplying labels to an injection mold for automatically supplying labels to one of a fixed die and a movable die for injection molding in which a core of said movable die is positioned with respect to said fixed die and a molding material is injected into a cavity formed between said fixed die and said core of said movable die, said method comprising the steps of:

providing a pseudo core with a hollow part, whose outer peripheral shape is formed to be substantially identical to an outer peripheral shape of said core, and which has a large number of small holes communicating with the outside, said hollow part of said pseudo core being made selectively connectable to an air sucking means and an air supplying means; making the outer periphery of said pseudo core contact, or be held close to, a rear surface of said label provided by label supplying means; sucking and holding the label onto the outer periphery of said pseudo core by means of air sucked by said air sucking means; inserting said pseudo core with the label sucked and retained thereon into said one of said dies and moving said pseudo core to a label delivering position; and canceling the suction of air at the label delivering position, supplying air to said hollow part by means of said air supplying means, and delivering the label held on the outer periphery of said pseudo core to an inner surface of said one of said dies by means of the pressure of the supplied air. As a result, it is possible to attain the object of automatically supplying a label to be inserted onto an inner surface of a die of an injection molding machine, and of enlarging the maximum area for label setting to the entire periphery of a molded product.

In accordance with the present invention, a part of the outer periphery of the pseudo core is contacted or is held close to the rear surface of the label supplied by the label supplying means, and then the sucking means is actuated. Therefore, air flow, which is oriented toward the sucking and discharging passages, is generated in the air surrounding the outer periphery of the pseudo core, so that the surrounding part is set under negative pressure. Consequently, the label is sucked onto the outer periphery of the pseudo core, consecutively from the place where the label contacts or is held close to, the part of the outer periphery of the pseudo core, toward the both ends, and is finally held around the outer periphery of the pseudo core.

Subsequently, after the pseudo core is inserted into one of the dies which is open (e.g., the fixed die), and is positioned at a label delivering position, the operation of the air sucking means is canceled and the air supplying means is actuated, so that the high-pressure air sent into the hollow part is discharged through the sucking and discharging passages. Hence, the label which is being held on the outer periphery of the pseudo core is supplied to the inner surface of the die by means of the exhaust pressure caused by the air discharge.

It should be noted that the aforementioned pseudo core is not exclusively required, namely, there are cases where it is possible to use a molded product itself (or one which is slightly modified) as the pseudo core. The method in which the molded product itself is used as the pseudo core is advantageous in that it becomes possible for the user to get the pseudo core of the label supplying apparatus easily and at low cost.

BEST MODE FOR CARRYING OUT THE INVENTION

Hereafter, a description will be given of an embodiment of the present invention with reference to the drawings.

Figure 1:
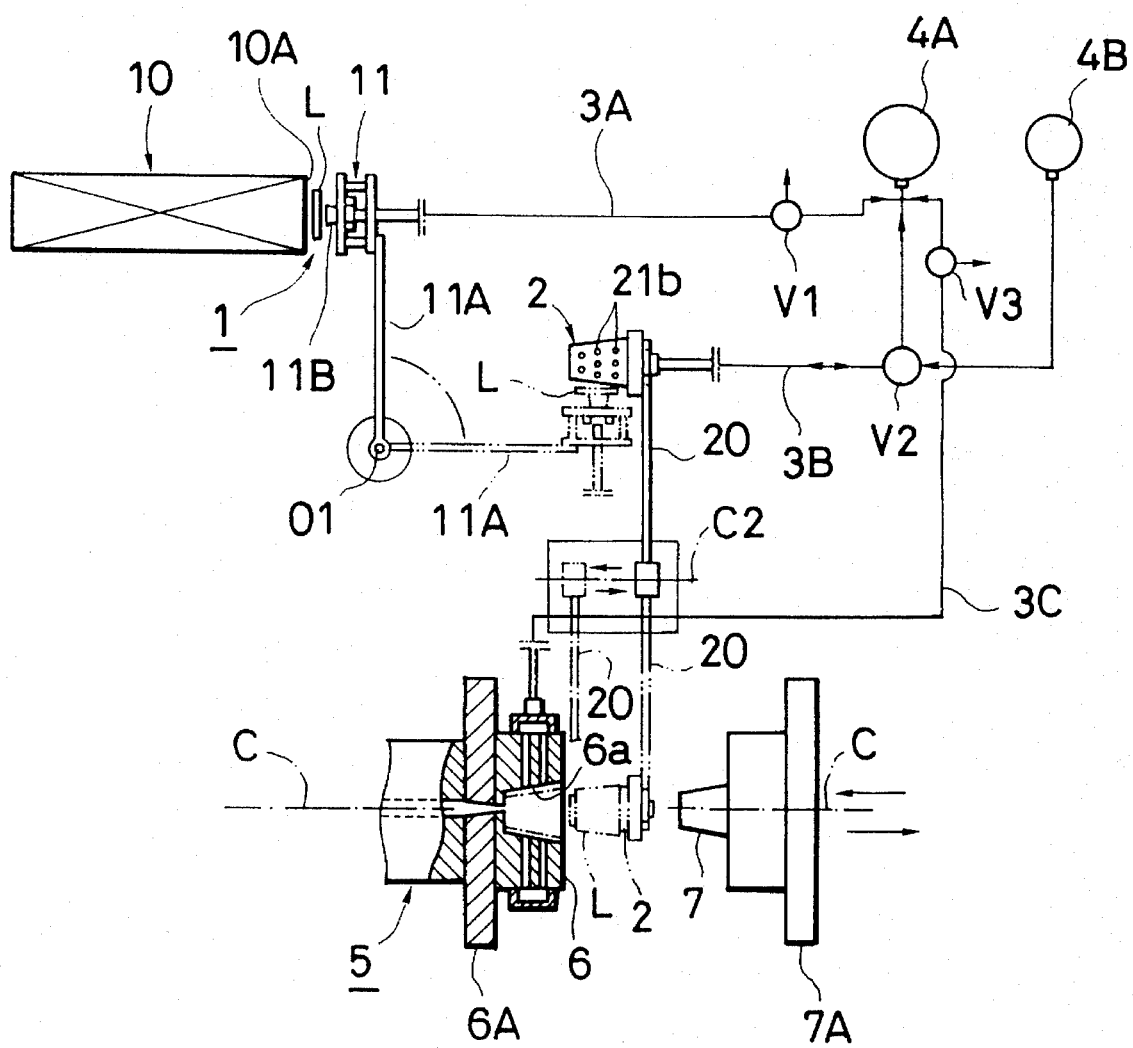
FIG. 1 is a schematic plan view illustrating an example of an apparatus in which the present invention is adopted.

FIG. 1 is a schematic plan view illustrating an example of an apparatus in which the present invention is adopted. A label supplying means 1 is constituted by a known label feeder. The label supplying means 1 comprises a first supplying means 10 for automatically supplying predetermined labels L one by one to an outlet port 10A, and second supplying means 11. The second supplying means 11 has an arm 11A which is swingable around a reference point 01 as a center of rotation from a position indicated by a solid line to a position indicated by a two-dotted chain line. The second supplying means 11 also has a number of suckers (only one is shown in FIG. 1) lib attached to the arm 11A. The sucker 11B is connected selectively to the atmosphere or a sucking means 4A such as a vacuum pump through a passage (hose) 3A having a selector valve V1.

Figure 2:
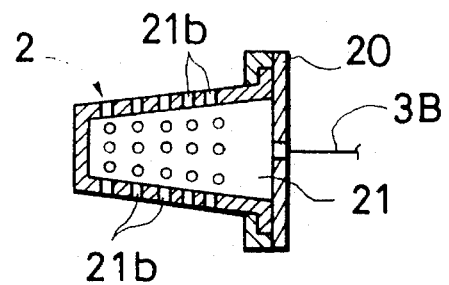
FIG. 2 is an enlarged cross-sectional view illustrating an example of a pseudo core.

A pseudo core 2 winds and holds the label L supplied from the second supplying means around an outer periphery thereof by means of sucked air, and supplies the same to an inner periphery of a fixed die of an injection molding machine which will be described later. As shown in FIG. 2, the pseudo core 2 is formed in the shape of a cup whose cross-section is a circle (of course, the shape of a cup whose cross-section is rectangular may be used), and has a large number of sucking and discharging passages 21b, 21b, . . . , in the periphery for allowing a hollow part 21 to communicate with the atmosphere. As shown in FIG. 1, this pseudo core 2 is attached to an arm 20, and the hollow part 21 is selectively connected to the aforementioned sucking means 4A such as a vacuum pump or an air supplying means 4B such as a blower through a passage (a hose) 3B having a selector valve V2.

The arm 20 is swingable around a reference line C2 as a center of rotation from a receiving position indicated by a solid line to a position on a longitudinal axis C of an injection molding machine 5 indicated by a two-dotted chain line. The arm 20 is horizontally movable from the two-dotted chain line to a feeding-out position indicated by a dotted chain line, i.e., to an insert position into a fixed die 6 mounted on the injection molding machine 5.

The fixed die 6 is detachably mounted on a known fixed die holder 6A in the injection molding machine 5. A movable die having a core 7 is detachably mounted on a known movable-die holder 7A in the injection molding machine 5, and the mold is opened or closed by the operation of an unillustrated mold clamping mechanism. Furthermore, a label holding part 6a is formed on an inner surface of the fixed die 6. This label holding part 6a is connected selectively to the atmosphere or the sucking means 4A such as the vacuum pump through a passage (hose) 3C having a selector valve V3.

Next, a description will be given of a procedure for supplying a label in the above-described arrangement.

Figure 3:
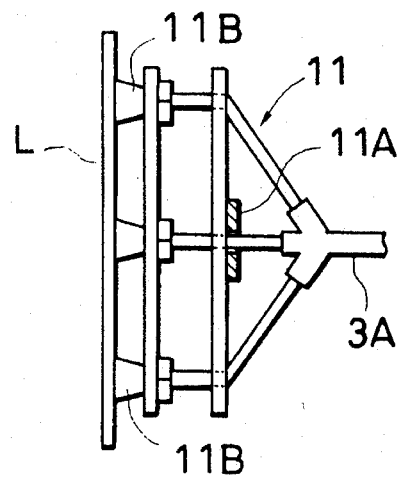
FIG. 3 is an enlarged side view illustrating a state where a label is received by a second supplying means.

At a point of time when one label L is supplied to the outlet port 10A of the first supplying means 10 in the label supplying means 1 in FIG. 1, the arm 11A of the second supplying means 11 is on stand-by at the position indicated by the solid line, i.e., at the position where the suckers 11B are close to the label L. Here, the selector valve V1 is changed over to the sucking means 4A side, thereby allowing the suckers 11B to suck the label L (see FIG. 3).

Figure 4:
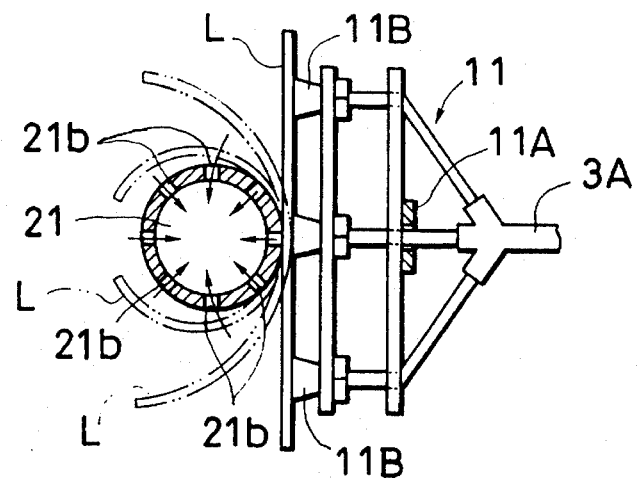
FIG. 4 is an enlarged side view illustrating a state of contact of the pseudo core.

After the label L is transferred to the second supplying means 11, the arm 11A is swung to the position indicated by the two-dotted chain line in FIG. 1. At this point of time, the pseudo core 2 is located at the receiving position indicated by the solid line in FIG. 1, and is contacted with a central part of the label L, as shown in FIG. 4 (the pseudo core 2 may, of course, be in a state in which it is held close to the central portion of the label L).

Figure 5:
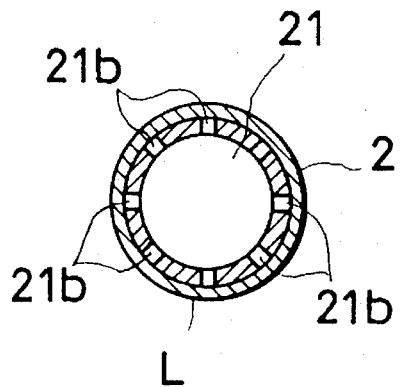
FIG. 5 is an enlarged cross-sectional view illustrating a state where the label is received by the pseudo core.

Subsequently, the selector valve V1 in FIG. 1 is changed over to the atmosphere side, and the selector valve V2 is changed over to the sucking means 4A side. As a result, air flow (see the arrows in FIG. 4) which is oriented toward the sucking and discharging passages 21b, 21b, . . . , is generated in the air surrounding the outer periphery of the pseudo core 2, and the surrounding part is set under negative pressure. Consequently, the label L becomes curved, as shown by phantom lines, from the place which contacts with a part of the outer periphery of the pseudo core 2 toward both ends. The label L is thus consecutively sucked onto the outer periphery of the pseudo core 2, and is finally wound and held around the outer periphery of the pseudo core 2, as shown in FIG. 5.

After the label L is wound and held around the pseudo core 2, the arm 20 in FIG. 1 is swung toward the position indicated by the two-dotted chain line so as to move the pseudo core 2 to the position on the longitudinal axis C of the injection molding machine 5. At this time, the arm 11A of the second supplying means 11 is returned to the position indicated by the solid line.

Figure 6:
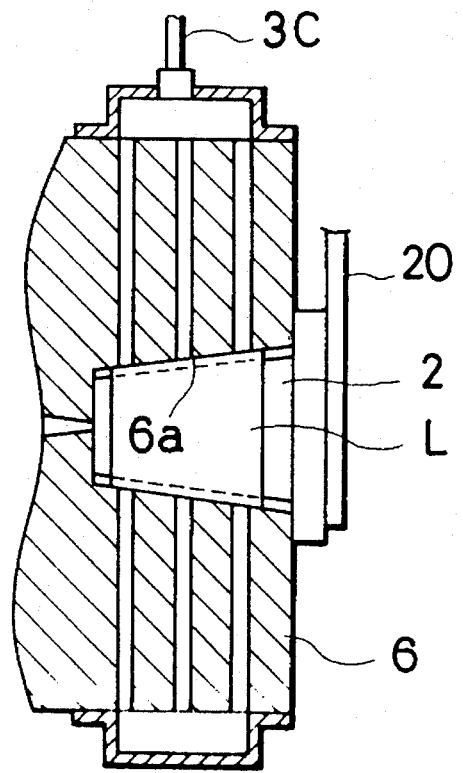
FIG. 6 is an enlarged cross-sectional view illustrating a state of insertion of the pseudo core into a fixed die.

At the point of time when the pseudo core 2 reaches the position on the longitudinal axis C of the injection molding machine 5, the swinging arm 20 is moved horizontally to the position indicated by the dotted chain line, and the pseudo core 2 is inserted into the fixed die 6 which is open, so as to be positioned, as shown in FIG. 6. Then, the selector valve V2 in FIG. 1 is changed over to the air supplying means 4B side to send high-pressure air into the hollow part 21 (see FIG. 2) of the pseudo core 2. The high-pressure air sent into the hollow part 21 is exhausted through the sucking and discharging passages 21b, 21b, . . . , and the label L is supplied to the label holding part 6a on the inner periphery of the fixed die 6 by means of the exhaust pressure.

Figure 7:
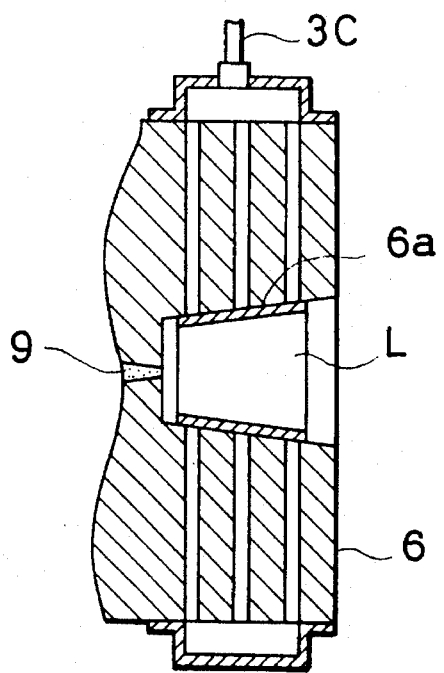
FIG. 7 is an enlarged cross-sectional view illustrating a state where the label is sucked and held by the fixed die.

If the selector valve V3 is changed over in advance to the sucking means 4A side, the label L supplied from the pseudo core 2 is sucked and held by the label holding part 6a on the inner periphery of the fixed die 6. After the label L is supplied, the arm 20 and the pseudo core 2 are moved horizontally to the positions indicated by the two-dotted chain lines. As a result, the label L remains on the inner side of the fixed die 6, as shown in FIG. 7.

Figure 8:
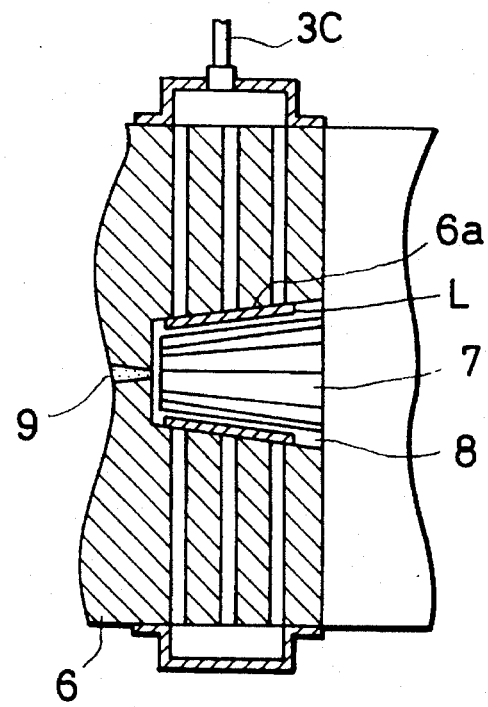
FIG. 8 is an enlarged cross-sectional view illustrating a state of mold closing.
Figure 9:
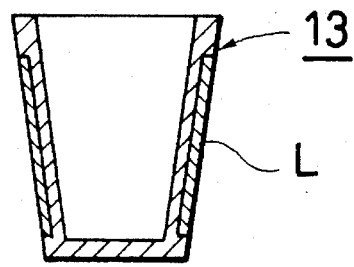
FIG. 9 is an enlarged cross-sectional view illustrating an example of a resin molded product.
Figure 10:
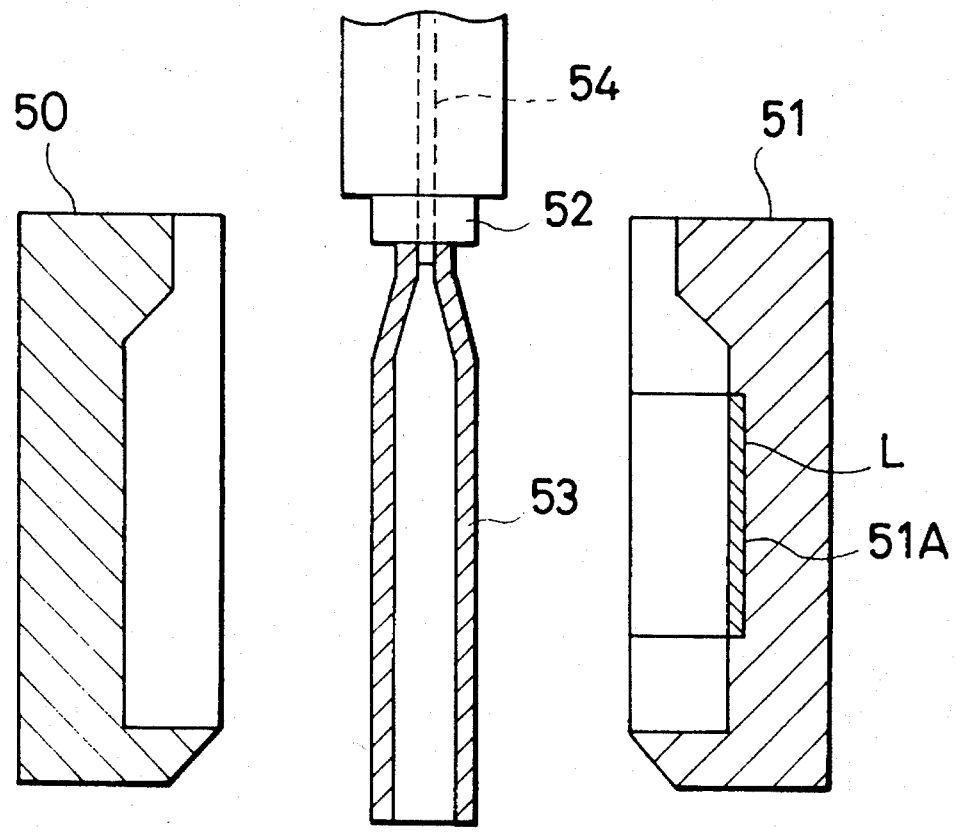
FIG. 10 is a cross-sectional view illustrating a premolding state of a comparative example.
Figure 11:
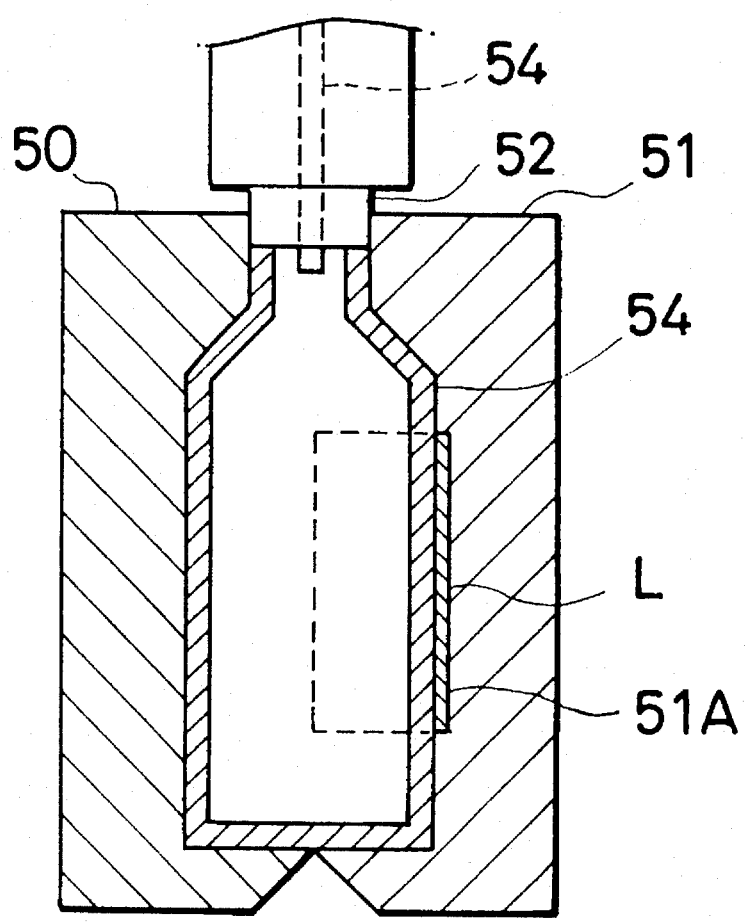
FIG. 11 is a cross-sectional view illustrating a molded state of the comparative example.

Subsequently, if the core 7 of the movable die, which is at the open position in FIG. 1, is inserted into the fixed die 6 so as to be closed, as shown in FIG. 8, and if a molding resin 9 is injected into a molding cavity 8 formed between both the dies 6 and 7, then it is possible to obtain a resin molded product 13 with the label L insert-molded thereon, as shown in FIG. 9.

By repeating the above-described procedure, similar resin molded products 13 can be manufactured continuously.

It should be noted that, in the above-described embodiment, a description has been given of a method in which one label L supplied by the label supplying means 1 is sucked and held by one pseudo core 2 and is then supplied onto the inner surface of the fixed die 6. However, an arrangement may be provided alternatively such that a number of labels L supplied simultaneously by the label supplying means 1 are sucked and held simultaneously by a number of pseudo cores 2, and are then supplied onto the inner surface of the fixed die 6. In addition, the mode of operation of the arm 20 is not limited only to the mode described in the above-described embodiment, and it is possible to adopt various modifications.

Furthermore, although, in the above-described embodiment, the label L is held onto the label holding part 6a of the fixed die 6 through suction by the sucking means 4A, the holding method is not limited to the same. For instance, an adhesive material may be applied in advance to one surface of the label.

Moreover, although, in the above-described embodiment, the core which is fabricated for exclusive use is used as the pseudo core, it is possible to use a molded product itself (or one which is slightly modified) as the pseudo core.

Although, in the above-described embodiment, an example in which a label is supplied to the fixed die side has been shown, there is a molding machine in which a label is supplied to the movable die side in a case where, for example, a back gate is provided (in the case of such as a lid of a container), and the present invention is naturally applicable to such a case as well.

CAPABILITY OF EXPLOITATION IN INDUSTRY

As described above, the present invention makes it possible to suck and hold a label around the outer periphery of a pseudo core and to automatically supply the same to the mold of an injection molding machine for carrying out insert molding. As a result, it is possible to enlarge a maximum area of label setting to the entire periphery of the molded product.

We claim:

1. A method for use with an injection mold, for automatically supplying labels to one of a fixed die and a movable die in an injection molding process in which a core of said movable die is positioned in said fixed die and a molding material is injected into a cavity formed between said fixed die and said core of said movable die, said method comprising the steps of:

providing a pseudo core with a hollow part, wherein an outer peripheral shape of said pseudo core is formed to be substantially identical to an outer peripheral shape of said core, said hollow part has a large number of small holes communicating with the outside, said hollow part is selectively connectable to air sucking means and air supplying means and said pseudo core is mounted on an arm;

pivoting said arm about a fixed point to bring said pseudo core to a first position;

applying said label from a label supplying means to said pseudo core by making the outer periphery of said pseudo core contact or be held close to a rear surface of said label at said first position while applying air suction to said hollow part, said suction causing said label to wrap around said pseudo core while said pseudo core remains stationary at said first position;

sucking and holding the applied label onto the outer periphery of said pseudo core by air sucked by said air sucking meanings;

pivoting said arm about said fixed point to move said pseudo core from said first position about said fixed point to a second position, wherein said second position is disposed between said fixed and said movable die;

inserting said pseudo core with the label sucked and retained thereon into said fixed die and moving said pseudo core to a label delivering position; and canceling the suction of air at the label delivering position, supplying air to said hollow part by said air supplying means, and delivering the label held on the outer periphery of said pseudo core to an inner surface of said fixed die by the pressure of the supplied air.

2. An apparatus for automatically supplying labels to one of a fixed die and a movable die of an injection mold in an injection molding process in which a core of said movable die is positioned in said fixed die and a molding material is injected into a cavity formed between said fixed die and said core of said movable die, said apparatus comprising:

a pseudo core with a hollow part, formed with a shape substantially identical to an outer peripheral shape of said core, and having a large number of small holes communicating between said hollow part and the outside;

a pivoting arm on which said pseudo core is disposed, said pivoting arm being swingable about a fixed point to move said pseudo core between a first position and a second position between said movable die and said fixed die;

a label pick up and retention means for picking up and retaining said labels to said pseudo core, wherein said label pick up and retention means consists essentially of an air sucking means;

air supply means;

a selector valve for selectively connecting said hollow part of said pseudo core to said air sucking means and said air supplying means;

supplying means at said first position for providing the label to said pseudo core at a label supplying position; and means for swinging said pivoting arm to move said pseudo core from the label supplying position of said label supplying means at said first position to said second position adjacent a label delivering position of said fixed die.

* * * * *